United States Patent [19]

Challberg

[11] Patent Number: 5,241,570
[45] Date of Patent: Aug. 31, 1993

[54] CORE-CONTROL ASSEMBLY WITH A FIXED FUEL SUPPORT

[75] Inventor: Roy C. Challberg, Livermore, Calif.

[73] Assignee: General Electric Company, San Jose, Calif.

[21] Appl. No.: 896,085

[22] Filed: Jun. 8, 1992

[51] Int. Cl.⁵ .................. G21C 7/00; G21C 19/00
[52] U.S. Cl. .................. 376/260; 376/233; 376/353; 376/362
[58] Field of Search .............. 376/233, 353, 362, 260, 376/223, 239

[56] References Cited

U.S. PATENT DOCUMENTS

4,904,443  2/1990  Carruth ..................... 376/233

*Primary Examiner*—Daniel D. Wasil
*Attorney, Agent, or Firm*—John S. Beulick

[57] ABSTRACT

In a boiling-water nuclear reactor, a core-control assembly comprises a control rod, a fuel support, a control-rod guide tube, a control-rod drive, and a control-rod-drive housing. The fuel support is welded to the control-rod guide tube. To remove the control-rod drive, the reactor vessel can be opened and the adjacent fuel bundles removed from the fuel support. Then the control-rod can be rotated after clearing the fuel support. The control rod is then rotated to decouple its bayonet connection to the control-rod drive. The control rod can then be lifted out of the reactor. This arrangement allows a control rod to be replaced without handling of the fuel support. In addition, the fuel support can be more securely installed since it does not need to be removed.

6 Claims, 6 Drawing Sheets

CORE-CONTROL ASSEMBLY WITH A FIXED FUEL SUPPORT

BACKGROUND OF THE INVENTION

The Government of the United States has rights to this invention under Contract No. DE-AC03-90SF18495.

This invention relates to nuclear reactors and, more particularly, to a core-control assembly for a dual-phase nuclear reactor. A major objective of the present invention is to provide for more convenient removal of a control rod in a nuclear reactor.

Nuclear reactors generate heat in a fissionable reactor core and transfer this heat by flowing coolant through the core. In dual-phase reactors, the flowing coolant stores energy in the form of a phase change, e.g., from liquid to vapor. Since dual-phase reactors are primarily boiling-water reactors, the phase change is from water to steam. Hereinbelow, the operation of dual-phase reactors generally can be extrapolated from the description of the following typical boiling-water reactor.

In a typical boiling-water reactor, a water-steam mixture rises from the core. The water is to be recirculated down a downcomer and then back up through the core. The steam is to be directed from the reactor for utilization; for example, the steam can drive a turbine, which, in turn, can drive a generator to produce electricity. Steam condenses as it gives up energy to the turbine; the condensate can be returned to the reactor vessel to merge with the recirculating water.

The core of this typical reactor comprises an array of fuel bundles with square cross section. The fuel bundles are supported from below by a fuel support. Each fuel support supports a group of four fuel bundles.

The heat generated in the core can be decreased by inserting control rods into the core; the generated heat can be increased by retracting control rods from the core. The control rods have a cruciform cross section with blades that can be inserted between the fuel bundles of a group of four. To the extent that the control rods are inserted, some of the neutrons that would otherwise travel from one bundle to another to promote fission are absorbed by the control rod.

The control rods are driven by control-rod drives that extend through the bottom of the reactor vessel. The control-rod drives are supported by control-rod-drive (CRD) housings, which are tubes that extend through the vessel bottom. The CRD housings support control-rod guide tubes (CRGTs) that help guide the vertical movement of the control rods. The fuel supports are seated on the CRGTs.

Control rods have a limited lifetime and must undergo scheduled replacement. Control-rod removal is a time-consuming and expensive procedure. Generally, the top of the reactor vessel and intermediate components are removed. Before all the fuel bundles are removed, blade guides are inserted into the core to provide lateral support that would otherwise be lost once the fuel bundles are removed. The last fuel bundles are then removed, followed by the fuel supports. The control rods are fully withdrawn. The control rods are rotated to effect decoupling from the control-rod drives. Once decoupled, the control rods can be removed.

The use of blade guides is undesirable because of the extra handling required. Blade guides are contaminated during control rod replacement. Since they are not used during reactor operation, they present a storage problem.

In some reactors, the need for blade guides is obviated by using control rods that extend to the top guide at the top of the core region. The top guide provides lateral support to the top of the fuel and guides the insertion and removal of fuel bundles. The same guides can be used to provide lateral support for control rods. However, designing the control rods to reach the top guide for lateral support can conflict with other design constraints. In any event, whether the top guide or blade guides provide lateral support, control rod removal is more cumbersome than is desired. What is needed is a core-control assembly that provides for more convenient removal of control rods. Preferably, such an assembly would obviate the need for blade guides.

SUMMARY OF THE INVENTION

In accordance with the present invention, a core-control assembly has a control-rod drive that can insert a control rod far enough up into a core that it clears a fuel support. The fuel support has an aperture that conforms to the star-shaped cross section of the control rod, thus the control rod cannot be rotated when it extends through the fuel support. Once the control rod clears the fuel support, it can be rotated for disengagement and removal. Since the fuel support need not be removed to replace a control rod, it can be welded to a CRGT below. To reduce the amount of insertion required to clear the fuel support, the blades of the control rod can be beveled or notched.

Each point of the star-shaped cross section corresponds to a control rod blade. The preferred cross section has four points, and thus is referred to as a cruciform cross section. These are conventionally used with fuel bundles having square cross sections. Alternatively, three-pointed star-shaped apertures conform to three-bladed control rods that can be used with hexagonal fuel bundles. Also, six-pointed star-shaped apertures can conform to six-bladed control rods that can be used with fuel bundles with triangular cross sections.

The core-control assembly comprises the control rod, the control-rod drive, a CRD housing, the CRGT, the fuel support, and a coupling mechanism between the control-rod drive and the control rod. Removal of the control rod involves removing a vessel top head, removing other reactor components such as a steam separator and a dryer, removing fuel bundles, insertion of the control rod to a decoupling position, rotation of the control rod to effect decoupling from the control rod drive, and lifting the control rod out of the reactor vessel. Preferably, the decoupling position is the same as a minimum power position of the control rod. Alternatively, the decoupling position can involve overtravel beyond the minimum power position.

One advantage of the present invention is that the fuel support piece does not need to be removed when a control rod is removed. This saves a costly and time-consuming step, and relieves the reactor plant of the logistics of transferring, storing, and reinstalling a fuel support. Because it does not need to be removed, the fuel support can be welded securely to the CRGT, forming an integral unit, decreasing fabrication costs and increasing the stability and reliability of the core-control assembly.

Where overtravel is required for the control rod to reach the decoupling position, the fuel support can provide lateral support while the control rod is at the minimum power position. Further provisions can be made for lateral support beyond the minimum power position. Since lateral support is provided by operational components at the minimum power position, blade guides need not be used for lateral support. This saves considerable time and expense, and relieves storage and disposal logistics. These and other features and advantages of the present invention are apparent in the following description with references to the drawings below.

In the figures, similar assemblies and corresponding elements of similar assemblies are referenced by common two-digit numbers (e.g., 22). Where it is desirable to distinguish between such similar elements, an alphabetical suffix is appended (22A, 22B etc.). Elsewhere, the suffix is omitted, for example, where the discussion describes characteristics common to the commonly numbered elements.

DESCRIPTION OF THE PREFERRED EMBODIMENTS

Figure 1:
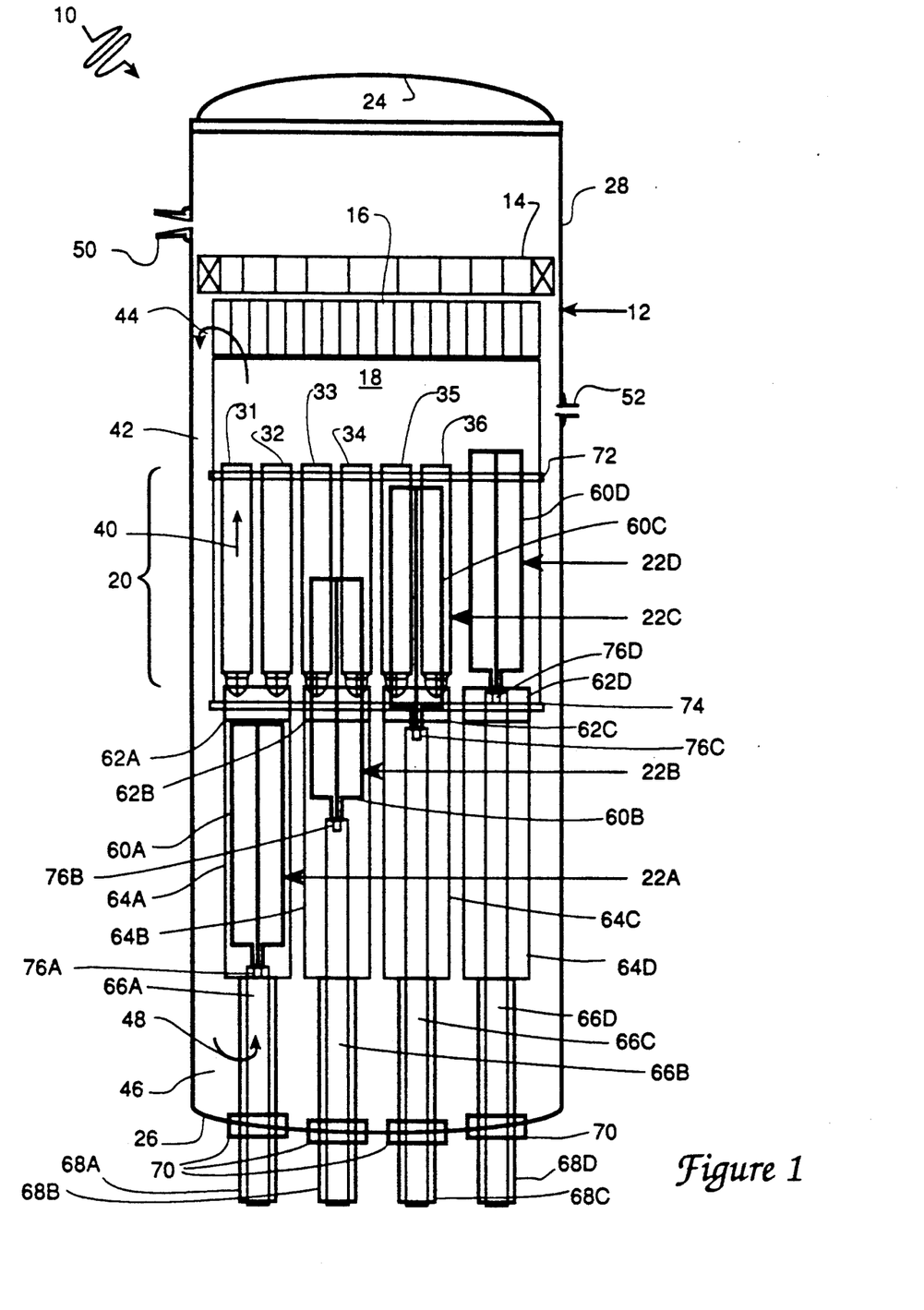
FIG. 1 is a schematic elevational view of a nuclear reactor including a core-control assembly in accordance with the present invention.

In accordance with the present invention, a boiling-water reactor 10 comprises a vessel 12, a dryer 14, a steam separator 16, a chimney 18, a core 20, and core-control assemblies 22(A-D), as shown in FIG. 1. Vessel 12 includes a top head 24, a bottom head 26 and a sidewall 28. Core 20 includes fuel bundles, including fuel bundles 31-36. Each fuel bundle contains fuel rods of fissile fuel. Chain reactions of this fissile fuel provide a sustained power output from reactor 10.

In normal operation, water flows into core 20 from below. Most of the water rising through core 20, as indicated by arrow 40, is converted to steam. Chimney 18 supports a steam head, promoting natural circulation of water within vessel 12. Steam separator 16 removes most of the water from the steam/water mixture rising from chimney 18. The separated water is directed radially from steam separator 16 and down a downcomer 42, as indicated by arrow 44. Water exiting downcomer 42 flows into a lower plenum 46, wherein core-control assemblies 22 are located. Water in lower plenum 46 is recirculated up through core 20 as indicated by arrow 48.

Dryer 14 removes any remaining water in steam rising from steam separator 16. The steam then exits vessel 12 via a main steam line nozzle 50. The exiting steam drives a turbine (not shown) which drives a generator (not shown) to produce electricity. As it drives the turbine, the steam condenses; the resulting condensate can be returned to vessel 12 via a feedwater return nozzle 52.

Each core-control assembly 22A-D includes a respective control rod 60A-D, a respective fuel support 62A-D, a respective control-rod guide tube (CRGT) 64A-D, a respective control-rod drive 66A-D, and a respective control-rod-drive (CRD) housing 68A-D.

CRD housings 68 extend through and are welded to stub tubes 70, which are in turn welded in apertures through bottom head 26. CRD housings 68 serve to support control-rod drives 66 and respective CRGTs 64. CRGTs 64 in turn support respective fuel supports 62, to which they are welded. Each fuel support 62 can contact and support four fuel bundles. For example, fuel support 62A contacts and supports fuel bundles 31 and 32 plus two others that are hidden by other components in FIG. 1. Fuel bundles 31-36 are held vertical by a top guide 72, which is basically a grid with openings above each respective fuel bundle. A core plate 74 similarly provides lateral stability for CRGTs 64 and fuel supports 62.

Control-rod drives 66 support and provide for vertical motion of respective control rods 60. Each control rod 60A-D has a respective coupling socket 76A-D. Each coupling socket 76A-D provides for bayonet engagement with a respective control-rod drive 66A-D.

Core-control assemblies 22 regulate the power output from core 20. Control-rod drives 66 control the vertical positions of respective control rods 60. Control rod 60A is in a fully retracted position that provides for maximum power output. Control rod 60B is in an intermediate position providing for intermediate power. Control rod 60C is in a minimum power position.

Control rods 60 have a cruciform cross section capable of controlling the neutrons to the four fuel bundles supported by the respective fuel support 62. In its minimum power position, control rod 60C absorbs a maximum number of neutrons that would otherwise travel between fuel bundles, e.g., between fuel bundles 35 and 36. When all control rods are so inserted to their minimum power positions, core 20 becomes subcritical and reactor 10 can be shut down.

Control rod 60A is fully retracted to a maximum power position. It does not absorb a significant number of neutrons passing between fuel bundles. Thus, with control rod 60A in this maximum power position, fuel bundles 31 and 32 provide their maximum power outputs. Control rod 60B is in one of a continuum of intermediate power positions so that fuel bundles 33 and 34 provide an intermediate level of power.

Control rod 60C is shown in a minimum power position. In the preferred embodiment, this minimum power position is also the decoupling position at which control rod 60C can be rotated and decoupled. As long as adjacent fuel bundles are in place, a control rod cannot be rotated, and thus cannot be decoupled. However, once the adjacent fuel bundles are removed, the control rod can be rotated and decoupled.

In an alternative embodiment, a control rod is not decoupled at the minimum power position. Instead, overtravel beyond the minimum power position is required. This overtravel is only achievable after respective fuel bundles are removed from the respective fuel support. For conciseness of illustration, control rod 60D is shown in the overtravel position used for decoupling in the alternative embodiment in FIG. 1. With fuel support 62D cleared and control rod 60D in the decoupling position, control rod 60D can be rotated to permit decoupling of the bayonet engagement of coupling socket 76D from control-rod drive 66D. Control rod 60D can then be removed from vessel 12.

Figure 2:
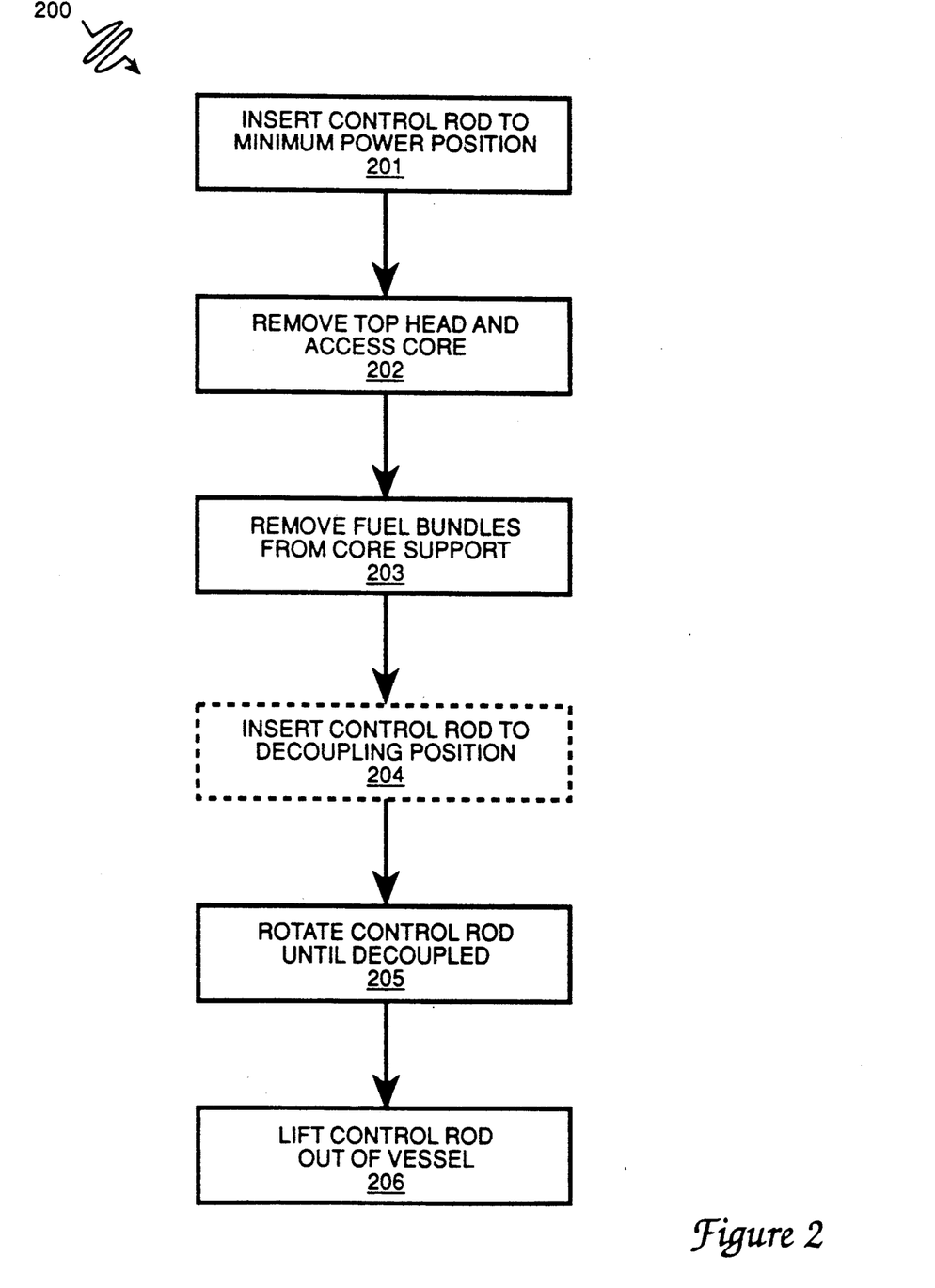
FIG. 2 is a flow chart of a method of removing a control rod of the core-control assembly of FIG. 1.

The present invention provides for the removal of a control rod in accordance with a method 200 illustrated in FIG. 2. In step 201, all control rods are inserted to their minimum power positions (in which control rod 60C is shown) and the reactor is shut down. In step 202, top head 24, dryer 14, and steam separator 16 are removed to provide access to core 20. The four fuel bundles associated with the control rod are removed at step 203. Where overtravel is required, this is performed at step 204 (shown in a dashed box to indicate that this step is conditional on the embodiment). At step 205, the control rod is rotated to decouple the bayonet connection. At step 206, the control rod is lifted out of reactor vessel 12.

Figure 3:
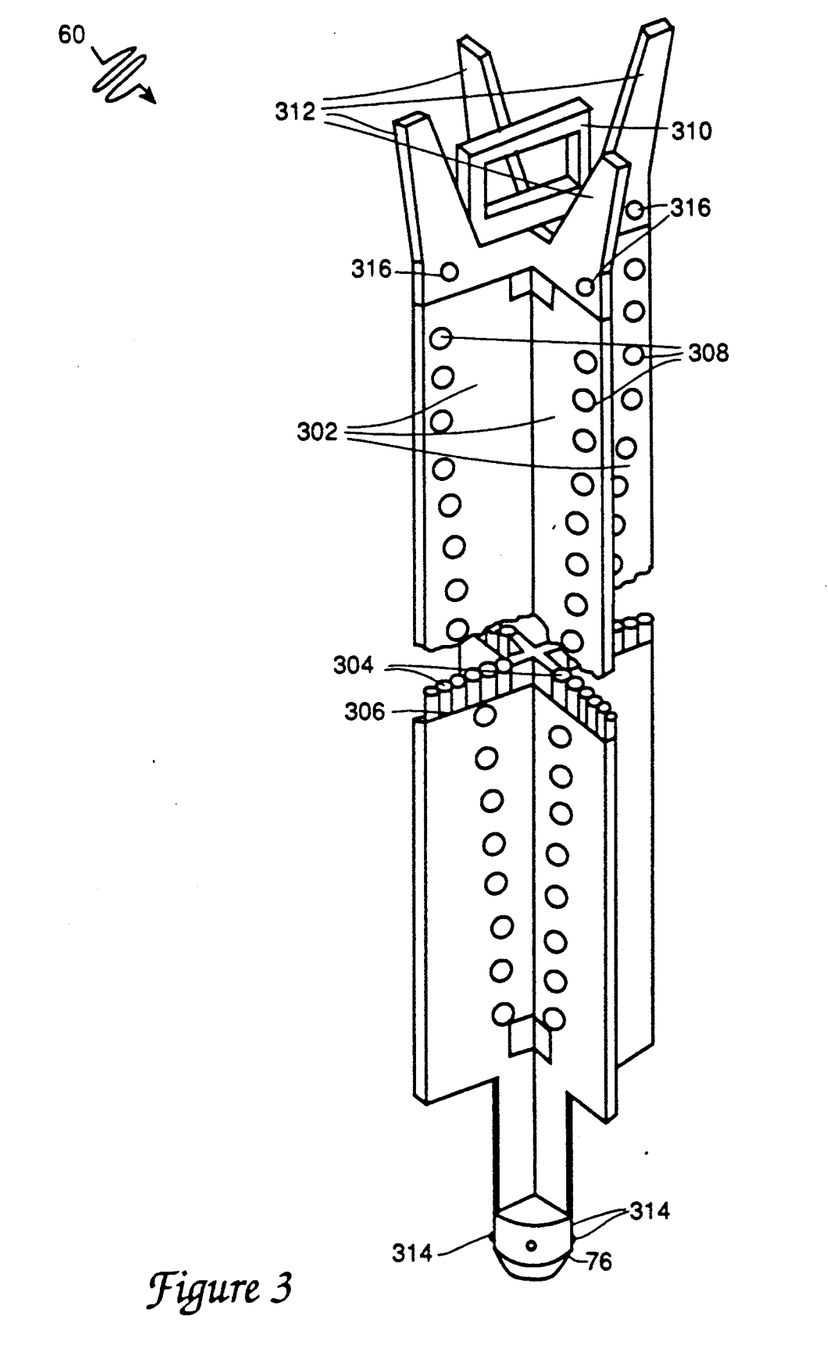
FIG. 3 is a perspective view of the control rod of the core-control assembly of FIG. 1.

One of the control rods 60 is shown in greater detail in FIG. 3. Control rod 60 has four blades 302, providing its cruciform cross section. Each blade 302 is filled with neutron-absorber rods 304 held in place by a sheath 306. Each blade 302 has a series of holes 308 that provide for coolant flow in and out of control rod 60. At the top of control rod 60 is a handle 310 providing for convenient insertion and removal of control rod 60 from above. Near handle 310 are four fins 312 that provide lateral support when they engage top guide 72 at the minimum and the decoupling position. Blades 302 are notched above coupling socket 76 to provide clearance relative to the respective fuel support 62.

Four coupling rollers 314 on coupling 76 reduce friction and guide vertical movement of control rod 60 within CRGT 64. Blade rollers 316 provide spacing and reduce friction between control rod blades 302 and adjacent fuel bundles, as is known in the art. Smooth metal pads can be used in place of rollers for the same purposes.

Figure 4:
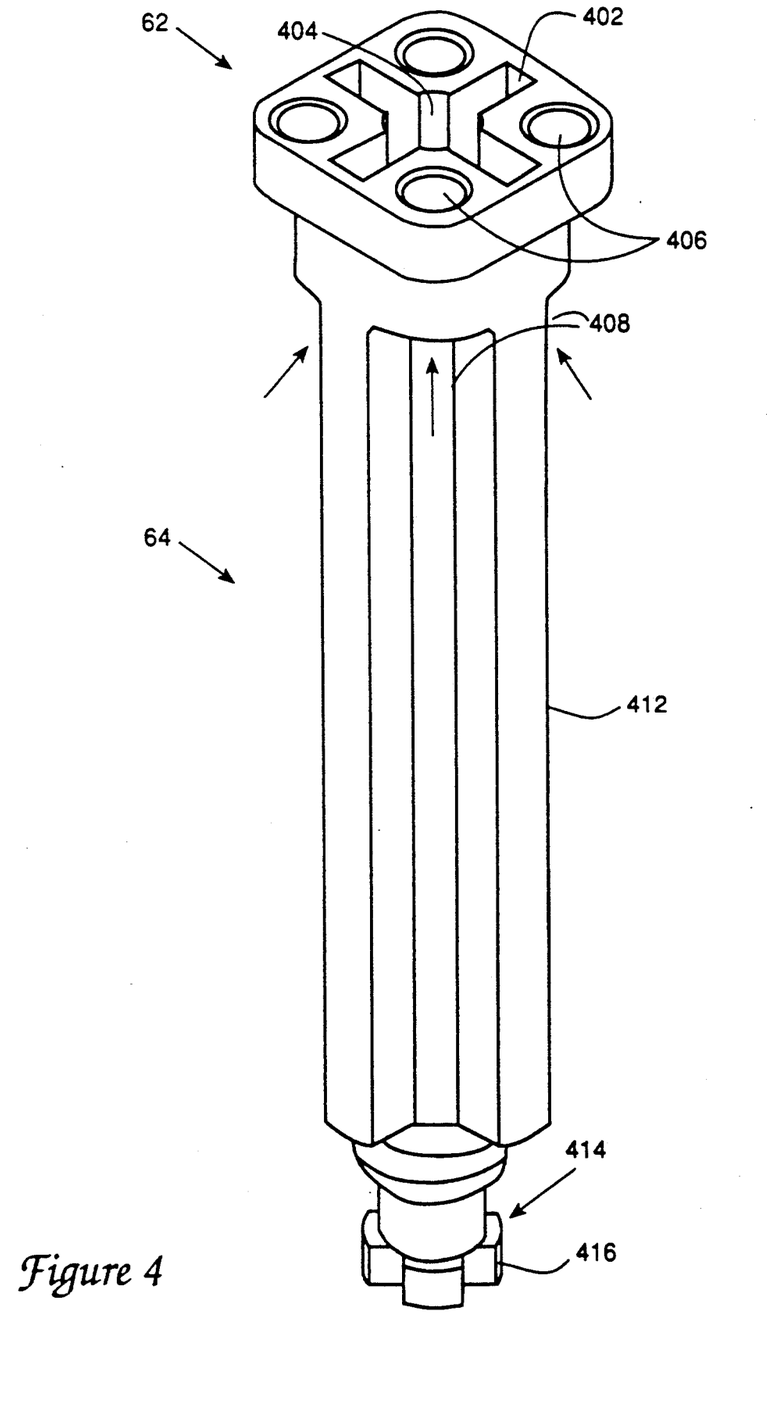
FIG. 4 is a perspective view of a fuel support and a control-rod-guide tube of the core-control assembly of FIG. 1.
Figure 5:
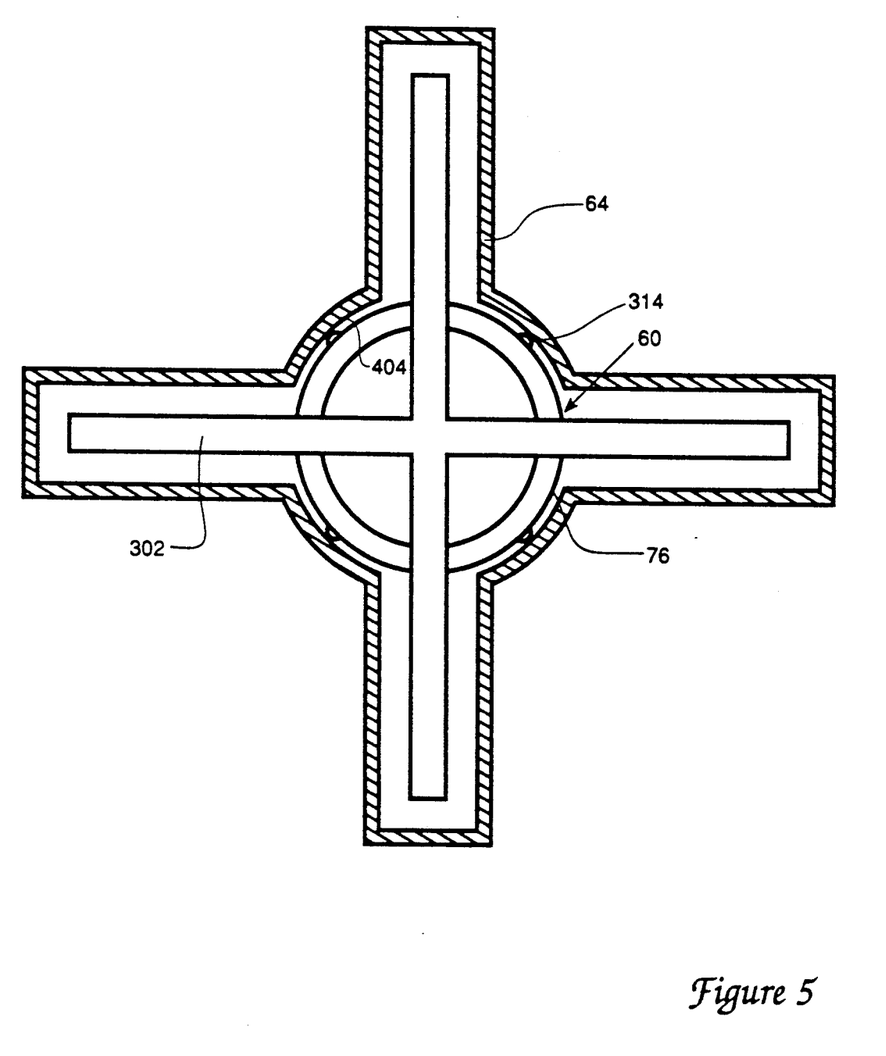
FIG. 5 is a top sectional view of the control rod of FIG. 3 and the control-rod-guide tube of FIG. 4.

Fuel support 62 and CRGT 64 are shown in FIG. 4. Fuel support 62 has a cruciform aperture 402 through which control rod 60, shown in FIG. 5, extends and moves. Rounded apexes 404 of cruciform aperture 402 engage coupling socket 76 when it is at the proper level. Fuel support 62 has four depressions 406 that cradle and support fuel bundles. Fuel support 62 also has four bottom ports 408 through which water enters core 20. CRGT 64 is cruciform in shape to provide lateral support to the lower end of control rod 60.

CRGT 64 has an elongated body 412 that is long enough to substantially contain control rod 60 when the latter is in its fully retracted position. At its base, CRGT 64 has a bayonet coupling 414 with four tabs 416. Bayonet coupling 414 provides for locking engagement of CRGT 64 with a respective control rod drive 66.

Figure 6:
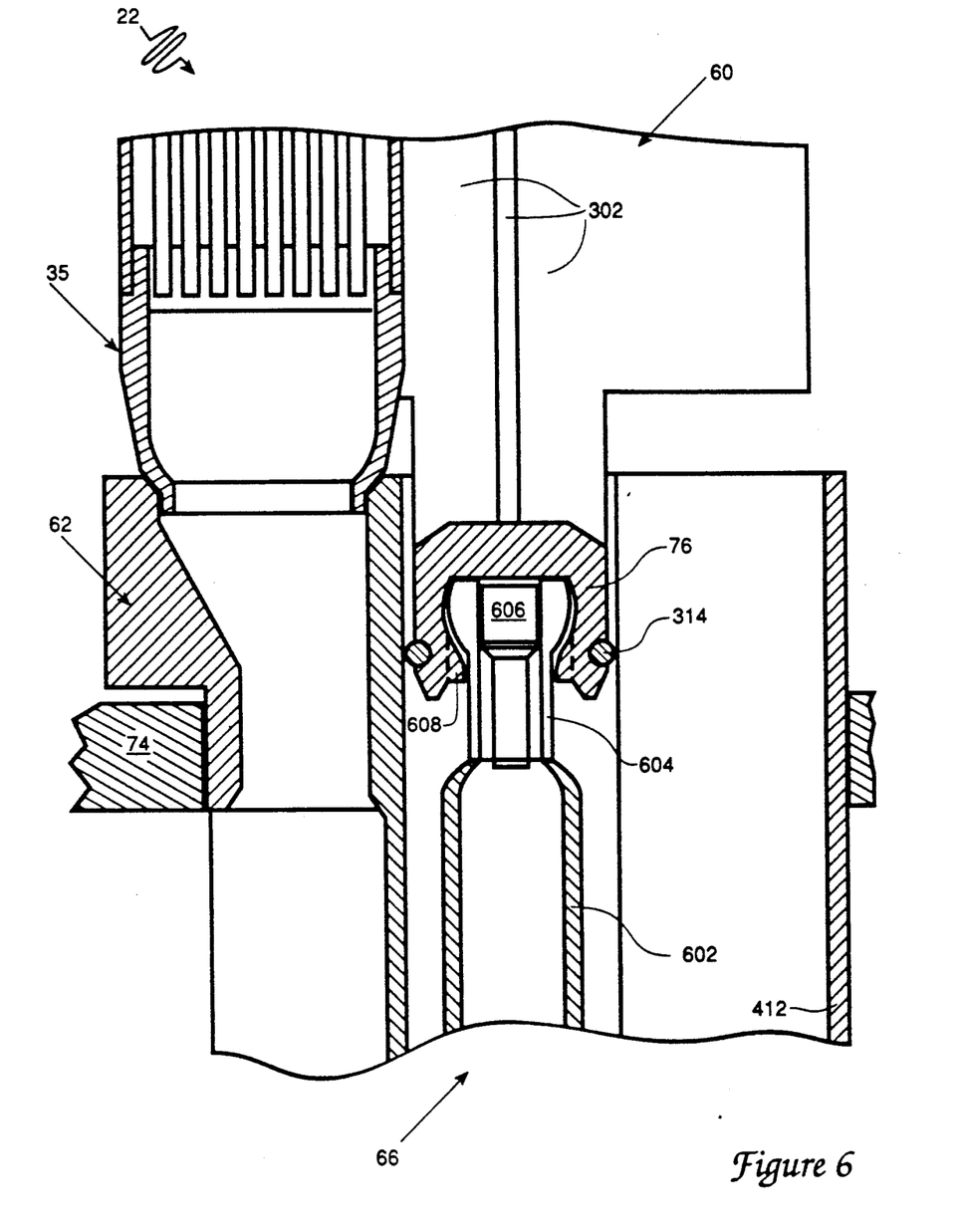
FIG. 6 is a schematic sectional view of a bayonet connection of the core-control assembly of FIG. 1.

The bayonet connections of control rod 60 to control-rod drive 66 in a core-control assembly 22 are shown in FIG. 6, in which control rod 60 is fully inserted. Control-rod drive 66 includes a hollow piston 602 that moves vertically with control rod 60.

Hollow piston 602 has four fingers 604 at its top, as shown in FIG. 6. A cylindrical spacer 606 provides radial support for these fingers 604. Coupling socket 76 of control rod 60 has a slotted opening 608 at its base for admitting fingers 604 when control rod 60 is lowered with an orientation 45° from that it assumes during reactor operation. A 45° clockwise rotation of control rod 60 secures the coupling. Fuel bundles can then be placed on fuel support 62. To decouple, fuel bundles are removed and a 45° counterclockwise rotation aligns fingers 604 with slotted openings 608 to permit decoupling.

While the foregoing has described its preferred embodiments, the present invention provides for considerable variation. As indicated above, some embodiments involve overtravel to reach a decoupling position, while others do not. Different control rods are provided for; for example, a control rod can include neutron-absorbing plates instead of rods. While the illustrated embodiment utilizes notched control rod, a beveled control rod and a control rod with a conventional squared bottom are also provided for.

The present invention is not limited to control rods with cross sections in the shape of four pointed stars. For example, cross sections with three or six points are provided for, for example where hexagonal or triangular fuel bundles are used. The same options are provided for the fuel support aperture. The nature of the cross section affects the degree of rotation required for coupling and decoupling. These and other modifications to and variations upon the described embodiments are provided for by the present invention, the scope of which is limited only by the following claims.

What is claimed is:

1. A method of removing a control rod from a boiling-water nuclear reactor, said control rod having plural blades, said method comprising:
   removing a top head of said reactor;
   removing all fuel bundles from a fuel support having an aperture conforming to the cross section of said control rod through its blades;
   positioning a control rod so that its blades clear said aperture sufficiently to permit decoupling of said control rod;
   rotating said control rod so as to decouple it from a control-rod drive; and
   lifting said control rod out of said reactor.

2. A method as recited in claim 1 further comprising an initial step of inserting all control rods to respective minimum power positions, said positioning step involving moving said control rod to a decoupling position above its minimum power position.

3. A core-control assembly comprising:
   a control rod having a plurality of blades;
   a control-rod guide tube for guiding vertical motion of said control rod;
   a fuel support for supporting fuel bundles separated by said blades, said fuel support having an aperture conforming to a cross section of said control rod through said blades for preventing rotational movement of said control rod to a decoupling orientation when said control rod is between a maximum power position and a minimum power position, said minimum power position being above said maximum power position, said fuel support being supported by said control-rod guide tube;
   control-rod drive means for controlling vertical motion of said control rod, said control-rod drive means providing for vertical motion between said maximum power position and said minimum power position, said control-rod drive means providing for vertical movement to a decoupling position, said decoupling position being no lower than said minimum power position, said decoupling position being at a level sufficient to permit said control rod to rotate to a decoupling orientation relative to said fuel support; and coupling means for coupling said control rod to said control-rod drive means, said coupling means being releasable by rotational movement of said control rod to said decoupling orientation relative to said control-rod drive means.

4. An assembly as recited in claim 3 wherein said decoupling position is the same as said minimum power position.

5. An assembly as recited in claim 3 wherein said decoupling position is above said minimum power position.

6. An assembly as recited in claim 3 wherein said fuel support is welded to said control-rod guide tube.

* * * * *